United States Patent
Wen et al.

(10) Patent No.: US 8,942,454 B2
(45) Date of Patent: Jan. 27, 2015

(54) SIGNAL TO-NOISE ENHANCEMENT IN IMAGING APPLICATIONS USING A TIME-SERIES OF IMAGES

(75) Inventors: Han Wen, Bethesda, MD (US); Vinay M. Pai, Potomac, MD (US)

(73) Assignee: The United States of America, as represented by the Secretary, Department of Health and Human Services, Washington, DC (US)

( * ) Notice: Subject to any disclaimer, the term of this patent is extended or adjusted under 35 U.S.C. 154(b) by 222 days.

(21) Appl. No.: 13/513,150

(22) PCT Filed: Nov. 30, 2010

(86) PCT No.: PCT/US2010/058301
§ 371 (c)(1),
(2), (4) Date: May 31, 2012

(87) PCT Pub. No.: WO2011/068783
PCT Pub. Date: Jun. 9, 2011

(65) Prior Publication Data
US 2012/0243763 A1  Sep. 27, 2012

Related U.S. Application Data

(60) Provisional application No. 61/266,442, filed on Dec. 3, 2009.

(51) Int. Cl.
*G06K 9/00* (2006.01)
*G06T 5/50* (2006.01)
(52) U.S. Cl.
CPC ......... *G06T 5/50* (2013.01); *G06T 2207/10088* (2013.01); *G06T 2207/20021* (2013.01)
USPC .......................................... 382/131

(58) Field of Classification Search
USPC ......... 382/128, 131, 254, 260, 266, 268, 282, 382/284, 294
See application file for complete search history.

(56) References Cited

U.S. PATENT DOCUMENTS

| | | | |
|---|---|---|---|
| 5,359,513 A | 10/1994 | Kano et al. | |
| 6,154,519 A | 11/2000 | Florent et al. | |
| 6,885,763 B2 * | 4/2005 | Ogino | 382/131 |
| 7,020,318 B2 | 3/2006 | Oshio et al. | |

(Continued)

OTHER PUBLICATIONS

Breeuwer et al., "Towards automatic quantitative analysis of cardiac MR perfusion images," *International Congress Series*, 1230:967-973, 2001.
Cebral et al., "Hemodynamics in Normal Cerebral Arteries: Qualitative Comparison of 4D Phase-Contrast Magnetic Resonance and Image-Based Computational Fluid Dynamics," *Journal of Engineering Mathematics*, 64(4):367-378, 2009.

(Continued)

*Primary Examiner* — Yon Couso
(74) *Attorney, Agent, or Firm* — Klarquist Sparkman, LLP

(57) ABSTRACT

An apparatus and method are disclosed for improving imaging based on a time-series of images. In one embodiment, a time-series of images are acquired using a same imaging protocol of the same subject area, but the images are spaced in time by one or more time intervals (e.g, 1, 2, 3 . . . seconds apart). A sub-region is projected across all of the images to perform a localized analysis (corresponding X-Y pixels or X-Y-Z voxels are analyzed across all images) that identifies temporal components within each sub-region. In some of the sub-regions, the temporal components are removed when the amplitude of the component is below a predetermined amplitude threshold. The images are then combined using the sub-regions with reduced components in order to obtain a single image with reduced noise.

23 Claims, 15 Drawing Sheets

(56) References Cited

U.S. PATENT DOCUMENTS

| | | |
|---|---|---|
| 7,218,108 B2 | 5/2007 | Ichinose et al. |
| 7,529,396 B2 | 5/2009 | Matsumoto |
| 7,542,622 B1 | 6/2009 | Angelini et al. |
| 7,576,741 B2 | 8/2009 | Matsumoto |
| 2002/0177771 A1 | 11/2002 | Guttman et al. |
| 2003/0097057 A1 | 5/2003 | Oshio et al. |
| 2003/0156762 A1* | 8/2003 | August .................. 382/260 |
| 2005/0151538 A1 | 7/2005 | Ichinose et al. |
| 2005/0275654 A1 | 12/2005 | Matsumoto |
| 2006/0181551 A1 | 8/2006 | Matsumoto |
| 2007/0126730 A1 | 6/2007 | Goto et al. |
| 2009/0028399 A1 | 1/2009 | Krishnan et al. |

OTHER PUBLICATIONS

Fish et al., "Scanning singular-value-decomposition method for restoration of images with space-variant blur," *Journal of the Optical Society of America A* 13(3):464-469, 1996.

Frindel, et al., "In vivo cardiac NMR Diffusion Weighted Imaging (DWI) for the human heart: improved quantification of FA and MD by edge-preserving regularization," *Proceedings 17th Scientific Meeting, International Society for Magnetic Resonance in Medicine*, p. 3771, 2009.

International Search Report and Written Opinion from the International Searching Authority for International Application No. PCT/US2010/058301, dated Mar. 30, 2011.

\* cited by examiner

SIGNAL TO-NOISE ENHANCEMENT IN IMAGING APPLICATIONS USING A TIME-SERIES OF IMAGES

CROSS REFERENCE TO RELATED APPLICATIONS

This is the U.S. National Stage of International Application No. PCT/US2010/058301, filed Nov. 30, 2010, which was published in English under PCT Article 21(2), which in turn claims the benefit of U.S. Provisional Application No. 61/266,442, filed Dec. 3, 2009.

FIELD

The present application relates to imaging, and particularly to noise reduction in imaging applications that use a time series of images.

BACKGROUND

Magnetic Resonance Imaging (MRI) is an imaging technique based in part on the absorption and emission of energy in the radio frequency range. To obtain the necessary magnetic resonance images, a patient (or other target) is placed in a magnetic resonance scanner. The scanner provides a magnetic field that causes magnetic moments in the patient or target atoms to align with the magnetic field. The scanner also includes coils that apply a transverse magnetic field. RF pulses are emitted by the coils, causing the target atoms to absorb energy. In response to the RF pulses, photons are emitted by the target atoms and detected as signals in receiver coils.

In several forms of MRI, it is desirable to obtain a time series of images. For example, diffusion weighted imaging (DWI) offers a means to evaluate an area of anatomy in terms of the motion of water molecules. The level of water diffusivity can provide an indication of the structure of the tissue at the cellular level. In terms of tumors within an organ such as, for example, the liver, the water diffusivity within the tumor is less than that of the healthy tissue of the organ because the cancerous cells are denser with more impediments to water motion. In a necrotic tumor, which has undergone treatment to kill cancerous cells, there is an increase in diffusivity compared to a viable tumor because in dead cancerous cells the membranes are broken down allowing greater motion of water molecules. Thus, measurement of water diffusivity can serve as a surrogate marker to evaluate tumor treatment response.

To obtain a proper dataset for DWI, a number of images are captured over a predetermined period of time (e.g., 10 images in 20 seconds). When multiple image slices are acquired for each dataset, it is desirable that the complete dataset be captured during one breath-hold to avoid motion of the anatomy. However, if the scan duration is too long, then these scans are generally done under free-breathing conditions with image registration being performed in post-processing. Physiological motion, such as motion from breathing, heart motion, and other tissue motion, cause intensity reductions in the resultant images and overwhelm water diffusivity measurements.

In order to reduce such intensity loss, Temporal Maximum Intensity Projection (TMIP) can be used, which is an extension into a temporal domain of a widely accepted volume rendering technique (MIP) that extracts high-intensity structure from volumetric scalar data. In TMIP, the highest sample value encountered across images is determined at each pixel over the time series. MIP approaches are commonly used to extract vascular structure from medical CT or MRI data sets and exploits the fact that the data values of vascular structures are higher than the values of the surrounding tissue. By depicting the maximum data value seen through each pixel, the structure of the vessels contained in the data is captured.

Even using TMIP, the resultant image can contain substantial noise. In particular applications of MRI, such as DWI, TMIP has been found to be especially ineffective.

SUMMARY

An apparatus and method are disclosed for improving imaging based on a time-series of images. The apparatus and method have been found particularly advantageous in medical imaging, such as in MRI scans for diffusion weighted imaging.

In one embodiment, a time-series of images is received. The images are generally acquired using a same imaging protocol of the same subject area, but the images are spaced in time by a fixed time periods (e.g., 1, 2, 3 . . . seconds apart) or indefinite time periods (i.e., each time interval being different). A sub-region (which is sized to be smaller than an image) is projected across all of the images. A localized analysis is performed (corresponding X-Y pixels are analyzed across all images) to identify temporal components within each sub-region. In at least some of the sub-regions, the temporal components are removed when the amplitude of the component is below a predetermined amplitude threshold. The images are then combined using the sub-regions with reduced number of components in order to obtain a single image with reduced noise. It should be noted that the localized analysis can easily be extended to three dimensions where X-Y-Z voxels are analyzed.

In another embodiment, the sub-regions can overlap. In such a case, some overlapping pixels are included in the localized analysis of multiple sub-regions. A weighting is used on such pixels based on their location in the sub-region where the localized analysis occurs. Pixels closer to the center of the sub-region can be given greater weighting.

In another embodiment, the multiple images can be combined by analyzing a maximum intensity value for each corresponding pixel in the images (i.e., pixels having the same X-Y coordinates in each image) and using the pixel with the highest intensity value as the pixel in the final image. Other techniques for combining can be used, such as an averaging of the pixels across images.

The foregoing and other objects, features, and advantages of the invention will become more apparent from the following detailed description, which proceeds with reference to the accompanying figures.

DETAILED DESCRIPTION

I. General Description

Figure 1:
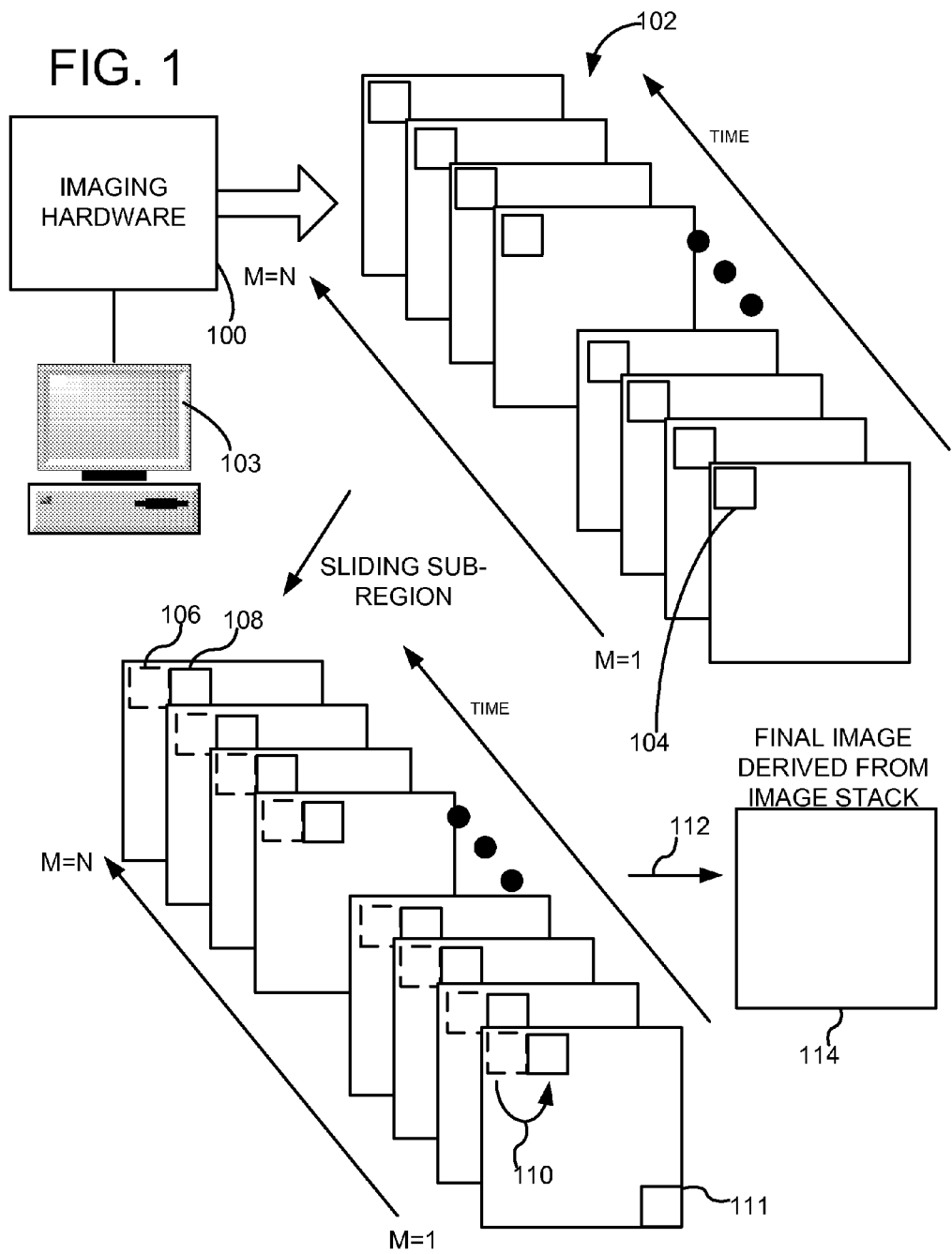
FIG. 1 is an embodiment showing an image stack acquired from imaging hardware and reducing the image stack to a single image with enhanced signal-to-noise ratio.

Disclosed below are embodiments of signal-to-noise enhancement in imaging applications that use a series of images. The embodiments should not be construed as limiting in any way. Instead, the present disclosure is directed toward all novel and non-obvious features and aspects of the various disclosed methods and systems, and equivalents thereof, alone and in various combinations and sub-combinations with one another. The methods disclosed herein are not performed purely in the human mind. Rather, they are performed using medical imaging hardware and computers to process the images.

As used in this application and in the claims, the singular forms "a," "an" and "the" include the plural forms unless the context clearly dictates otherwise. Additionally, the term "includes" means "comprises." When used in a sentence, the phrase "and/or" can mean "one or more of" the elements described in the sentence. Embodiments described herein are exemplary embodiments of the disclosed technologies unless clearly stated otherwise.

Although the operations of some of the disclosed methods and systems are described in a particular, sequential order for convenient presentation, it should be understood that this manner of description encompasses rearrangement, unless a particular ordering is required by specific language set forth below. For example, operations described sequentially can in some cases be rearranged or performed concurrently.

For the sake of simplicity, the figures may not show the various ways in which the disclosed methods and systems can be used in conjunction with other methods and systems. Additionally, the description sometimes uses terms like "display," "capture" and "perform" to describe the disclosed technology. These and other terms are high-level abstractions of the actual operations that are performed. The actual operations that correspond to these terms may vary depending on the particular implementation and are readily discernible by one of ordinary skill in the art.

Any of the methods described herein can be performed using software comprising computer-executable instructions stored on one or more computer-readable storage media. Furthermore, any intermediate or final results of the disclosed methods can be stored on one or more computer-readable storage media. Computer-readable storage media can include non-volatile storage such as, for example, read-only memory (ROM), flash memory, hard disk drives, floppy disks and optical disks. Computer-readable storage media can also include volatile storage such as, for example, random-access memory (RAM), device registers and processor registers. Any such software can be executed on a single computer or on a networked computer (for example, via the Internet, a wide-area network, a local-area network, a client-server network, or other such network).

The software embodiments disclosed herein can be described in the general context of computer-executable instructions, such as those included in program modules, which can be executed in a computing environment on a target real or virtual processor. Generally, program modules include routines, programs, libraries, objects, classes, components, data structures, etc., that perform particular tasks or implement particular abstract data types. The functionality of the program modules can be combined or split between program modules as desired in various embodiments. Computer-executable instructions for program modules can be executed within a local or distributed computing environment. For clarity, only certain selected aspects of the software-based implementations are described. Other details that are well known in the art are omitted. For example, it should be understood that the disclosed technologies are not limited to any specific computer language, program, or computer. For instance, the disclosed embodiments can be implemented using a wide variety of commercially available computer systems. Any of the disclosed methods can alternatively be implemented (partially or completely) in hardware. Portions of one or more disclosed methods can be executed by different parts of a distributed computing environment.

Additionally, intermediate or final results (e.g., one or more images), created or modified using any of the disclosed methods can be stored on one or more tangible computer-readable storage media. In some cases, intermediate or final results (e.g., one or more images), produced by any of the disclosed methods, can be presented to a user using a suitable device (e.g., a computer monitor). Such presentation and/or storing can be performed as part of a computer implementation of any of the disclosed methods.

Furthermore, any of the software embodiments (comprising, for example, computer-executable instructions for causing a computer to perform any of the disclosed methods) can be transmitted, received, or accessed through a suitable communication means. Similarly, intermediate or final method results, created or modified using any of the disclosed methods, can be transmitted, received, or accessed through a suitable communication means. Such suitable communication means include, for example, the Internet, the World Wide Web, an intranet, cable (including fiber optic cable), magnetic communication means, electromagnetic communication means (including RF, microwave, and infrared communications), electronic communication means, or other such communication means. Such communication means can be, for example, part of a shared or private network.

FIG. 1 is a diagram according to one embodiment wherein imaging hardware 100, such as MRI, CT scan, or X-ray, can be used to capture a time series of images, such as shown at 102. Other imaging modalities can also be used, such as PET, SPECT, ultrasound or optical. Such imaging devices are well-known in the art. For example, MRI hardware uses magnets having coils for producing gradients in the X, Y and Z directions. Within the coils (also called gradient coils) is an RF coil that produces a magnetic field and that detects spin signals generated in the object being imaged. The spin signals are passed to a computer, such as computer 103 controlling the entire process. RF components under control of the computer are the radio frequency source and pulse programmer. The source produces an oscillatory wave of the desired frequency. The pulse programmer shapes the RF pulses into sync or similar design pulses. The computer 103 also controls the gradient pulse programmer, which sets the shape and amplitude of each of the gradient fields. An operator of the imaging hardware 100 can provide input to the associated computer using a control console. A display can be associated with the computer 103 and allows the operator to provide input into the imaging hardware and visualize images on the display.

The imaging hardware 100 can capture a time series of images, such as shown at 102. There is generally uniform motion behavior of a subject over the series of images when the same imaging protocol is used to capture the images and the images are reasonably close in time. However, there is usually motion in the object (e.g., breathing) being imaged that can cause noise across the time series of images. In FIG. 1, the number of images is equal to N, which is any number, typically greater than 1. A typical example is 10 images, but other numbers can be used. A sub-region 104 (also called a sliding window) can be used to analyze a portion of the image. For example, for images of 128×128 pixels, a sub-region can be 11×11 pixels, but other size images and sub-regions can be used. Typically, the sub-regions are between $\frac{1}{8}^{th}$ and $\frac{1}{15}^{th}$ of the size of the images 102. The sub-region is typically a two-dimensional geometric region that can have boundaries defined by X and Y coordinates. Alternatively, the sub-region can be a line segment or any collection of pixels near each other. Also, for volumetric datasets, the sub-region can be a volumetric collection of pixels near each other, such as a cuboid, sphere or ellipsoid. For volumetric datasets, corresponding sub-volumes are projected across all of the N images so that the same X-Y-Z coordinates are analyzed for each sub-volume.

The sub-region 104 is moved or slid from a first area 106 to a next area 108, as indicated at 110. The first and second areas 106, 108 can be partially overlapping so that the same pixels in the images 102 are covered in both areas. The sub-region is continuously moved across the image until substantially all of the pixels in the images are covered. The final sub-region is shown at 111. As shown by arrow 112, the series of images are collapsed into a single final image 114 that is a combination of all the images, using methods as is further described below.

Figure 2:
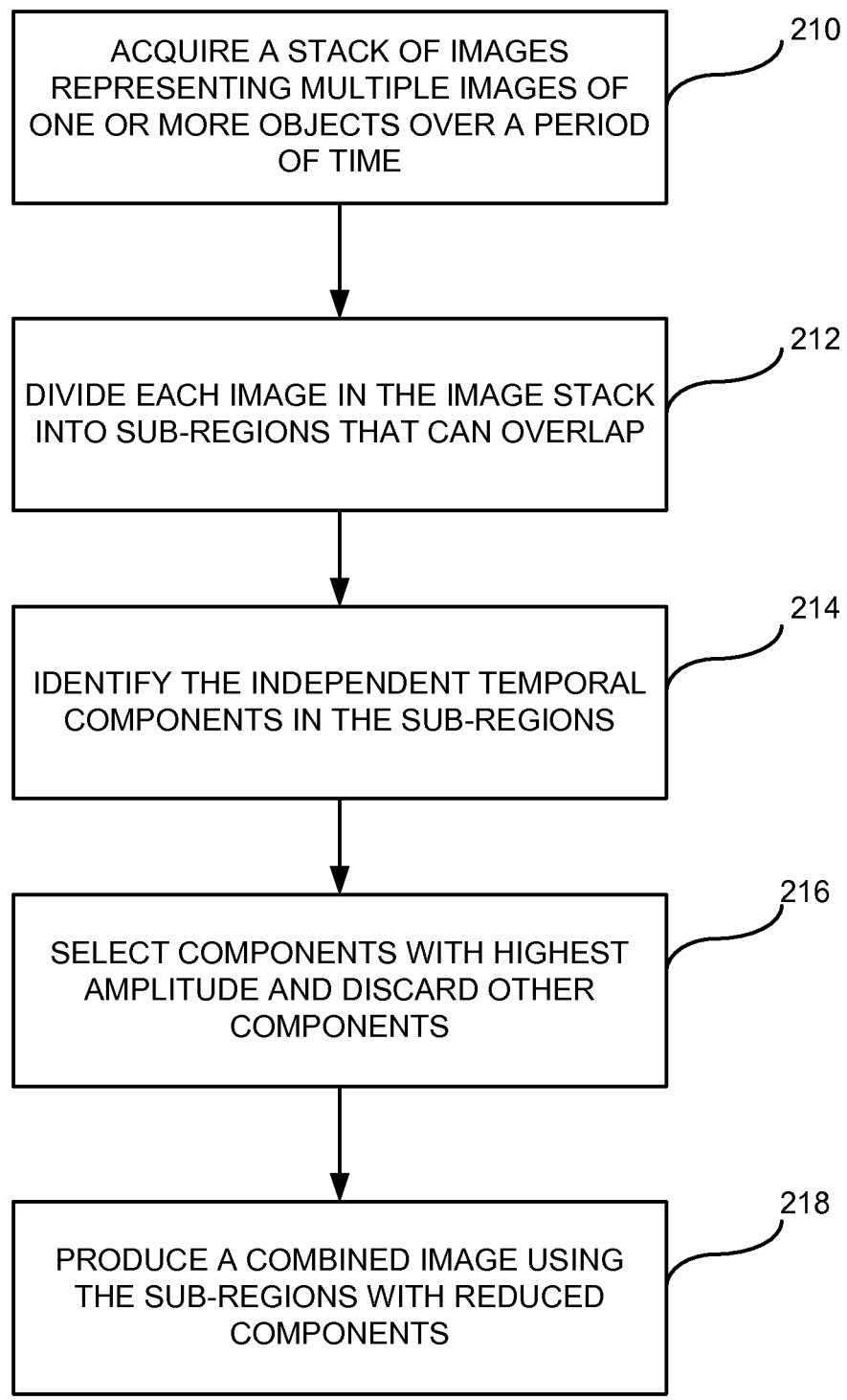
FIG. 2 is a flowchart of a method for reducing noise in the image stack.

FIG. 2 is a flowchart of a method for producing the final image from a series of images. In process block 210, a stack of images is acquired using medical imaging hardware. The temporal stack of images represent multiple images of the same subject, meaning the same region of a body is taken for all images. Ideally, each image would be identical, but due to breathing or other motion, the images have motion components between them. Each subject can have more than one object being imaged. For example, the same subject area can have two or more body organs. In process block 212, each image is divided into sub-regions. The size and geometric configuration of the sub-regions can be defined through user input. Alternatively, the size and geometric configuration can be predetermined. Additionally, the sub-regions can be overlapping or not overlapping. In process block 214, independent temporal components are identified in the sub-regions. In process block 216, components with the highest amplitude are selected and others are discarded. For example, it can be decided that a component has an amplitude threshold or a threshold of its amplitude relative to the sum of amplitudes of all components, which if not exceeded excludes that component from the analysis. On the other hand, multiple components can exceed the amplitude threshold and can be included in the analysis. However, limits can be set on the number of qualifying components (e.g., 0, 1 or 2 components). For example, a maximum of two components can be selected and the others discarded. In such a case, the components with the highest amplitude are taken and the others are removed. By removing the components in the sub-regions, noise is substantially reduced. If none of the components meet the amplitude threshold, then no components are included for that sub-region. In any event, each sub-region is treated independently for component analysis. In process block 218, the images are combined using the sub-regions with reduced components to obtain a final image with improved signal to noise ratio. One example of combining images is using TMIP, but other techniques can be used for combining, such as an averaging of pixels.

Figure 3:
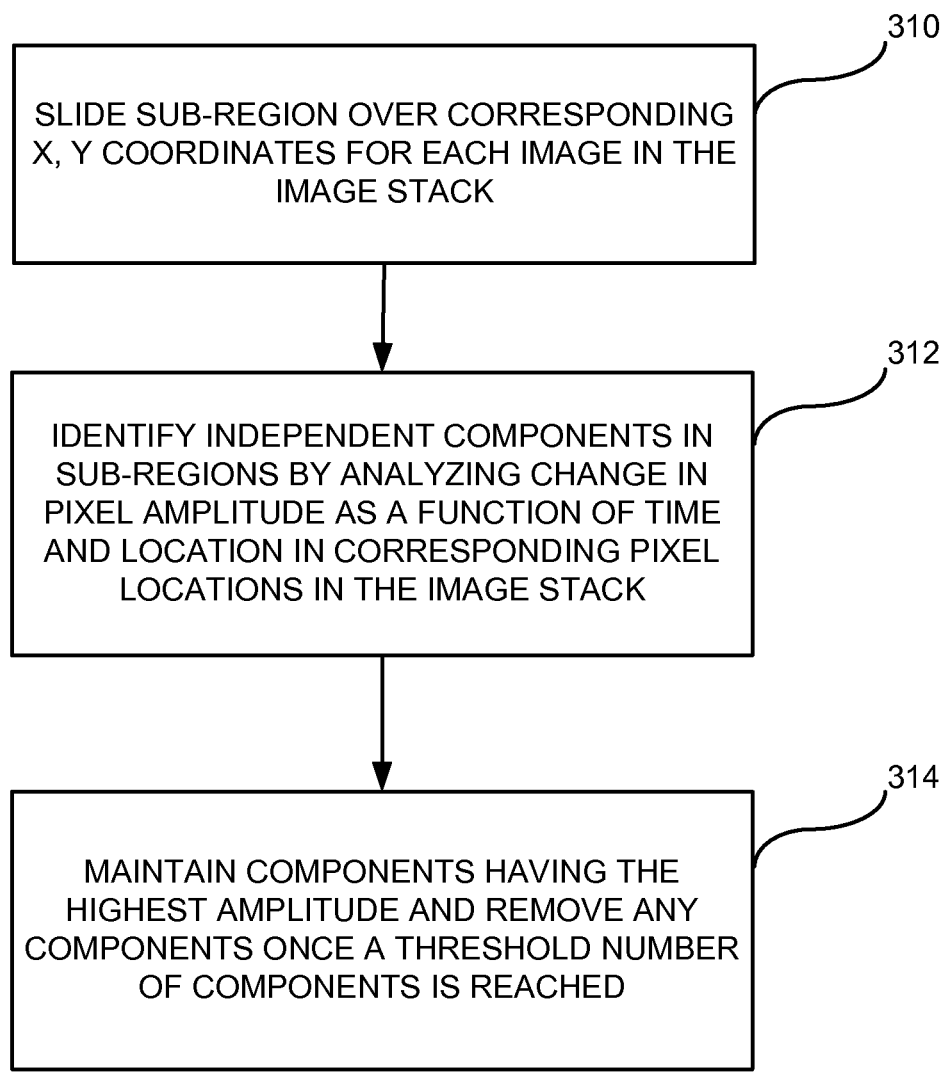
FIG. 3 is a flowchart showing further details that can be included in the method of FIG. 2.

FIG. 3 is a flowchart of an embodiment showing process blocks that can be performed in addition to FIG. 2. In process block 310, dividing the image into sub-regions (corresponding to process block 212) is typically accomplished by sliding a sub-region over corresponding XY coordinates for each image in the image stack. Thus, a sub-region is projected across the same XY coordinates on each image so that a sub-region in each of the series of images is analyzed together. The sub-region is then slid to different XY coordinates and the process is repeated. In process block 312, for a current sub-region, different independent components are identified. To identify components, the amplitude for the pixel is plotted as a function of time. A comparison can be made between the resultant functions from different locations in the current sub-region being analyzed. Each different component is defined as having a unique function. Different body parts typically will have different functions. For example, the function for a liver will appear different than the function for a kidney. Thus, an analysis can be made of a change in pixel intensity as a function of time and location in corresponding pixel locations in the image stack. In process block 314, components having the highest amplitude are maintained and others are removed, until a threshold number of components or a noise threshold value is reached.

Figure 4:
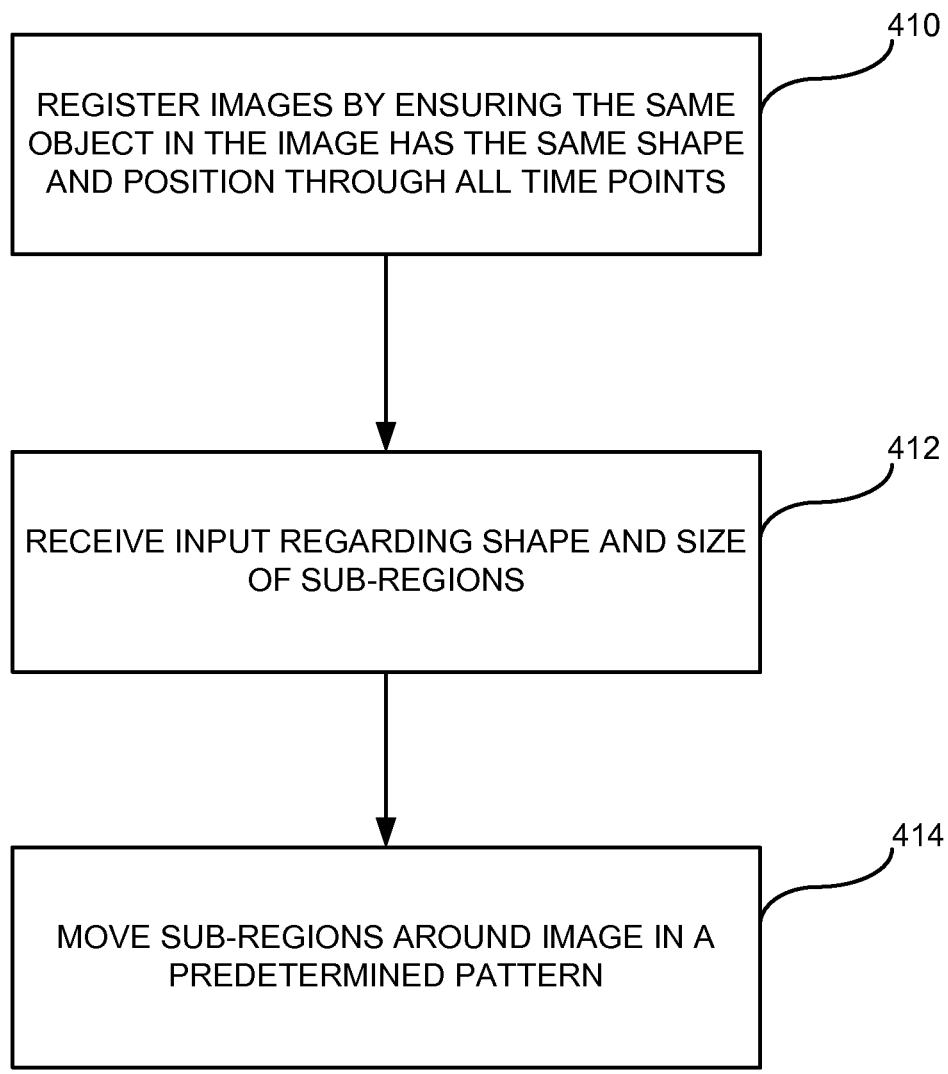
FIG. 4 is a flowchart showing additional details that can be included in the methods of FIGS. 2 and 3.

FIG. 4 is a flowchart of a method showing additional process blocks that can be performed. In process block 410, the series of images are registered. By registering the images, the same object in the image has substantially the same shape and position through all of the time points. The registration can be envisioned as a stretching of an object and a realigning if necessary so that the same object is as uniform as possible across all images. The registration can be performed on a localized sub-region, rather than performed on images as a whole. One example registration is called elastic warping registration, which is well-known in the art. Other registration techniques can be used. In process block 412, the imaging software running on a computer can receive user input regarding the shape and size of the sub-regions. For example, the sub-regions can be any desired geometric shape, such as squares, rectangles, circles, ovals, triangles, etc. Alternatively, a sub-region can be any collection of pixels near each other, such as a line segment. Also, for volumetric datasets, the sub-region can be a volumetric collection of pixels near each other, such as a cuboid, sphere or ellipsoid. The user can set the size and shape through a user interface on computer 103. For example, the user can input the width and length of the sub-region in terms of pixels (e.g., a rectangle of 15 pixels by 10 pixels). In process block 414, the sub-region is moved or slid around the image in a predetermined pattern. The user can also input the amount of overlap that occurs as the sub-region is slid around the image region. In any event, the sub-regions divide the image area to ensure that each pixel in the images or in the region of interest in the image is analyzed.

Figure 5:
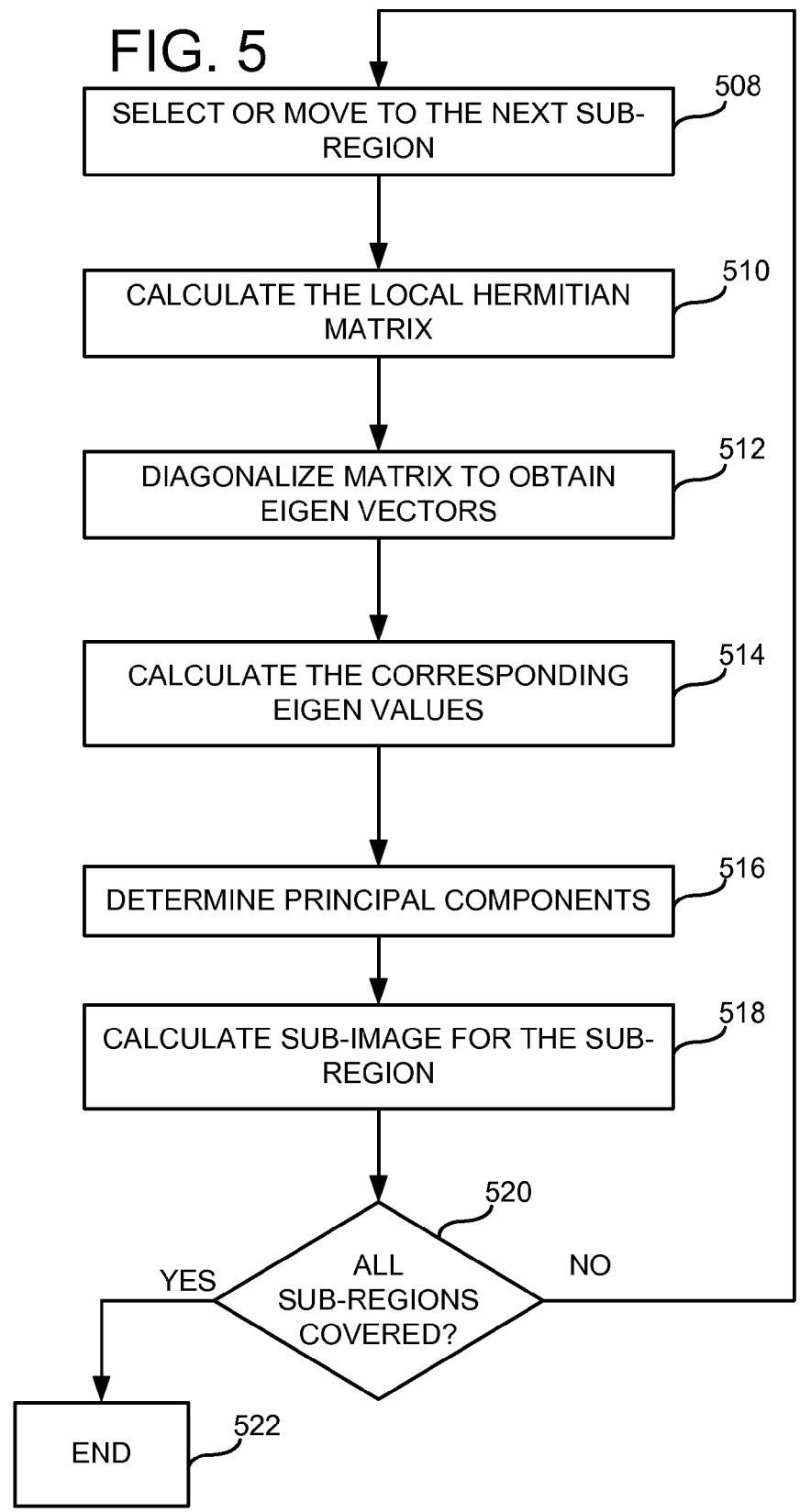
FIG. 5 is a flowchart of a method for analyzing a sub-region of the image stack.

FIG. 5 is a flowchart of an embodiment for analyzing each sub-region. In process block 508, a next sub-region is selected or moved to. In process block 510, a Hermitian matrix is calculated. Consider a 2-D raw imageset I (x,y,m) where m=0, 1, . . . N−1 is the number of repetitions of the 2D acquisition. This imageset is divided into sub-regions (also known as box-cars). For this limited example, a rectangle or square boxcar, I(a,b,m) (Note that 0<a≤x and 0<b≤y) is being considered.

To calculate the Hermitian matrix, the following equation can be used:

$$H(m,n)=\iint I^*(a,b,m)I(a,b,n)dadb$$

In process block 512, the matrix is diagonalized to obtain eigen vectors $V_j(m)$:

$$\Sigma_M V_i^*(m)V_j(m)=\delta_{ij}$$

where $\delta_{ij}$ is the Kronecker delta. The corresponding eigen values are also calculated (process block 514). The eigen values represent the amplitudes of the eigen vectors, and the corresponding principal components described below.

In process block 516, the principal components Pj(a,b) are calculated over the subregion.

$$P_j(a,b) = \sum_m I(a,b,m)V_j^*(m)$$

such that $$\iint P_i(a,b)P_j(a,b)dadb=0 \text{ unless } i=j$$

In process block 518, the new image is calculated for the sub-region using a limited number of principal components.

$$I'(a,b,m) = \sum_j P_j(a,b)V_j(m)$$

Typically the number of components selected are 2 (i.e. j=0 and 1). Hence, $$I'(a,b,m)=P_0(a,b)V_0(m)+P_1(a,b)V_1(m)$$

In decision block 520, it is determined whether all sub-regions have been covered so that each pixel has been included in a calculation. If yes, then the process ends at 522. If not, then the process returns to process block 510 and each process block can be repeated for successive sub-regions until the entire image region (x,y) is covered.

In any subregion, the number of principal components to use (e.g., 0, 1, 2, 3, etc.) are determined by either the corresponding eigen values or by calculating the eigen value weights using the equation:

$$w_i = \frac{\varepsilon_i}{\sum_{t=1}^{m} \varepsilon_t}$$

While the first principal component can be used by default, the second principal component can be selected when the second eigen value or eigen value weight is above a predetermined value. By applying weights to develop image intensities across all the pixels within a subregion (or boxcar), weights are assigned to each pixel. If the center pixel of the boxcar is (xc, yc), then for any pixel (x, y) within the box, the weighting is given by:

$$w(x,y|x_c,y_c) = \begin{cases} \dfrac{1}{(x-x_c)^2+(y-y_c)^2} & \text{(for off-center pixels in the box)} \\ a\left[\displaystyle\sum_{\substack{all\ off\text{-}center \\ pixels\ in\ box}} \dfrac{1}{(x-x_c)^2+(y-y_c)^2}\right] & \text{(for the center pixel)} \end{cases}$$

where "a" is a constant being typically a high value, such as 20.

An alternative weighting formula is as follows:

$$w(x,y|x_c,y_c) = \begin{cases} C\dfrac{1-\alpha}{r^2} & \text{(for } r \ne 0\text{)} \\ \alpha & \text{(for } r = 0\text{)} \end{cases}$$

where C is a normalization factor, $\alpha \in [0, 1]$ (typically greater than 0.75), and r is the distance between pixels $(x_c, y_c)$ and (x, y).

For each pixel (x, y) in the image, the final intensity is determined by:

$$I''(x,y,m) = \frac{\sum_{all(x_c,y_c)within\ box} w(x,y|x_c,y_c)I'(x,y,m|x_c,y_c)}{\sum_{all(x_c,y_c)within\ box} w(x,y|x_c,y_c)}$$

Subsequently, a pixel-wise temporal maximum intensity projection (TMIP) operation yields the final image $\Theta(x, y)$:

$$\Theta(x,y) = \operatorname*{MAX}_{m=0}^{N-1}(I''(x,y,m))$$

In any subregion, the number of principal components to be used can be determined by accepting the eigenvalues $\epsilon_I$ that are greater than the noise threshold:

$$\epsilon_I \ge \beta \langle \epsilon \rangle_{N-a}$$

where β is the threshold multiplier for the eigen values determined in simulation and imaging experiments as detailed below, < > implies averaging and a is the number of eigen values that have been selected to be accepted. If no eigen value is greater than the noise threshold, then no principal components are chosen for that sub-region.

Figure 6:
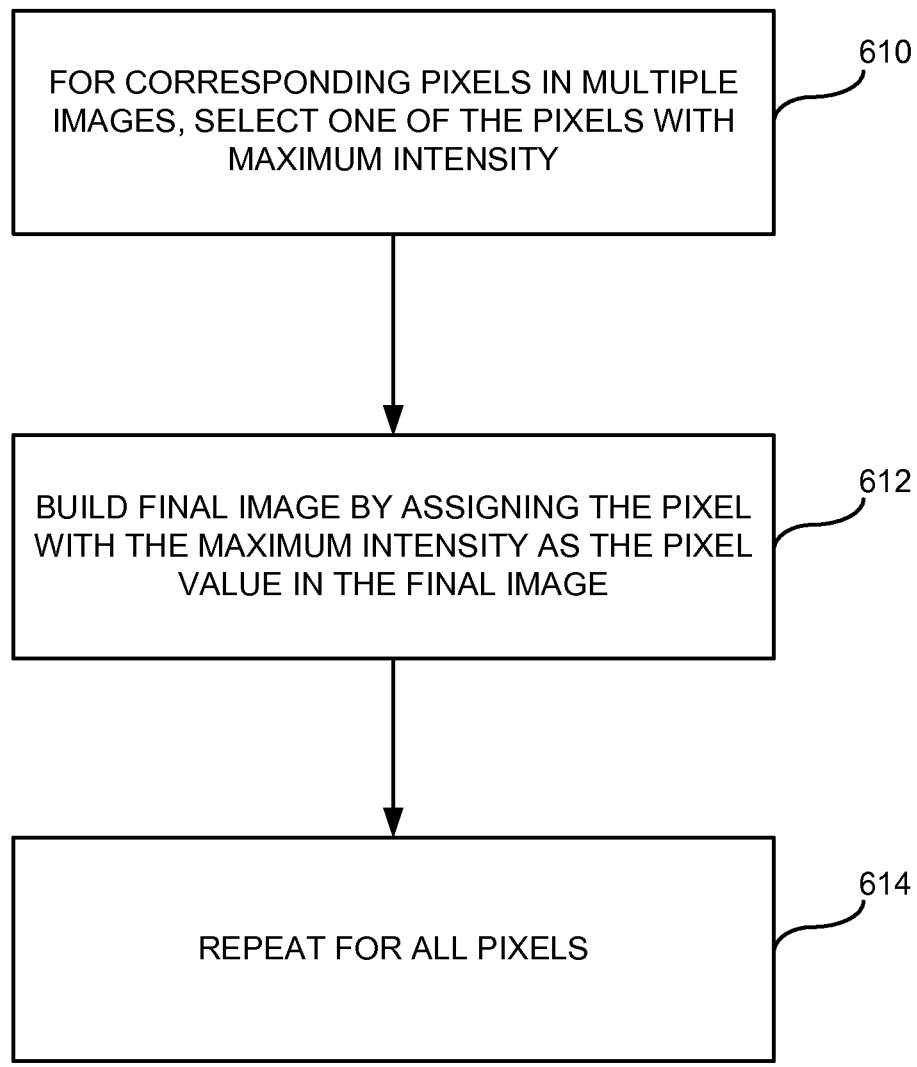
FIG. 6 is a flowchart of a method for building a final image from the stack of images.

FIG. 6 is a flowchart of a method for combining the series of images into a single image. In process block 610, corresponding pixels having the same XY coordinates for each image are analyzed and the pixel with the maximum intensity is chosen. In process block 612, the final image is built by assigning the pixel with the maximum intensity as the pixel with the same XY coordinates in the final image. The maximum intensity evaluation and assignment is repeated for all pixels in the image (process block 614). It should be noted that the process blocks of FIG. 6 can be performed by combining sub-regions first and then assembling the sub-regions together to form the final image or the sub-regions can be combined together for each image and then the series of images are combined.

Figure 7:
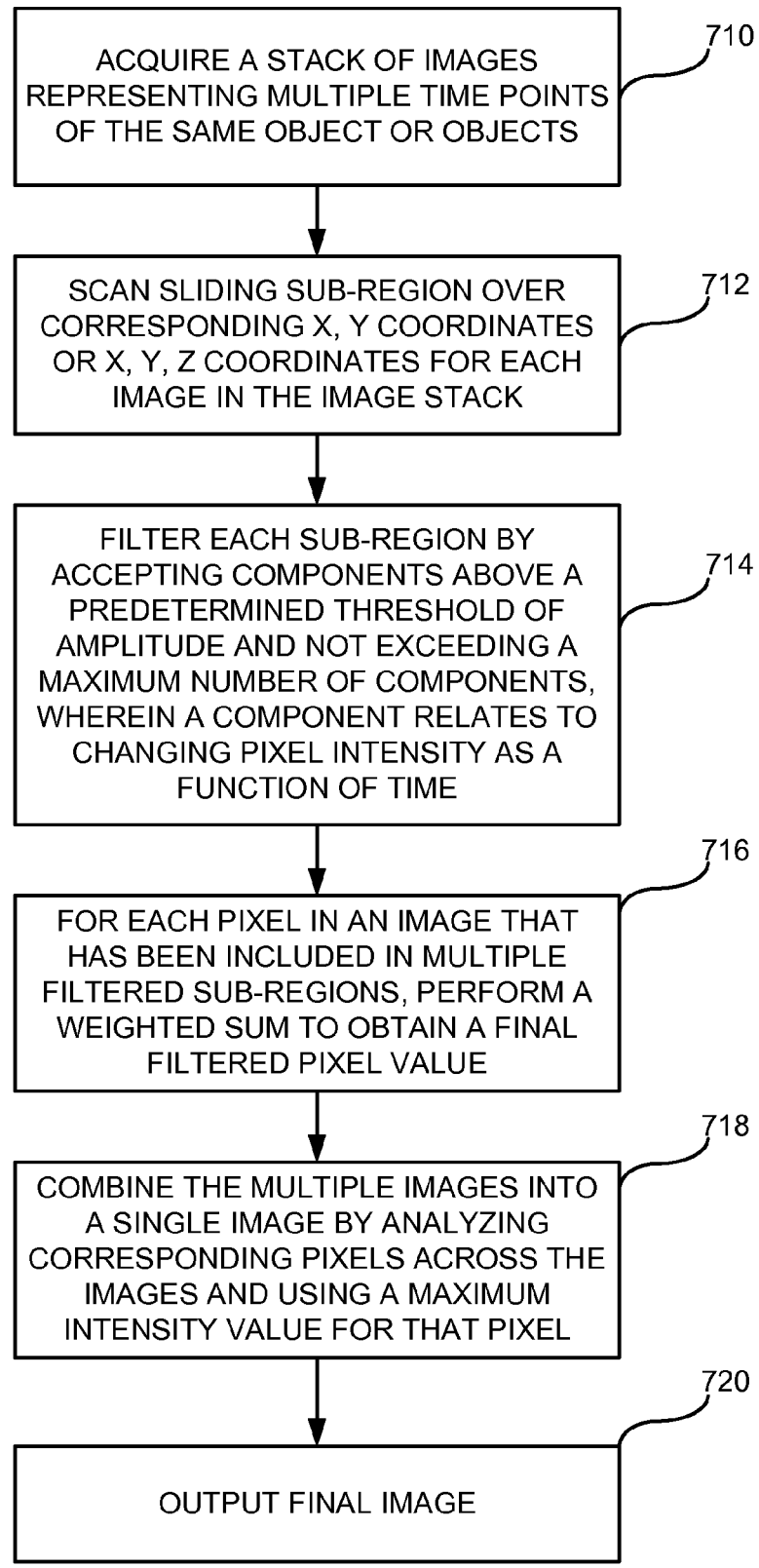
FIG. 7 is a detailed flowchart of a method for reducing noise in an image stack.
Figure 8:
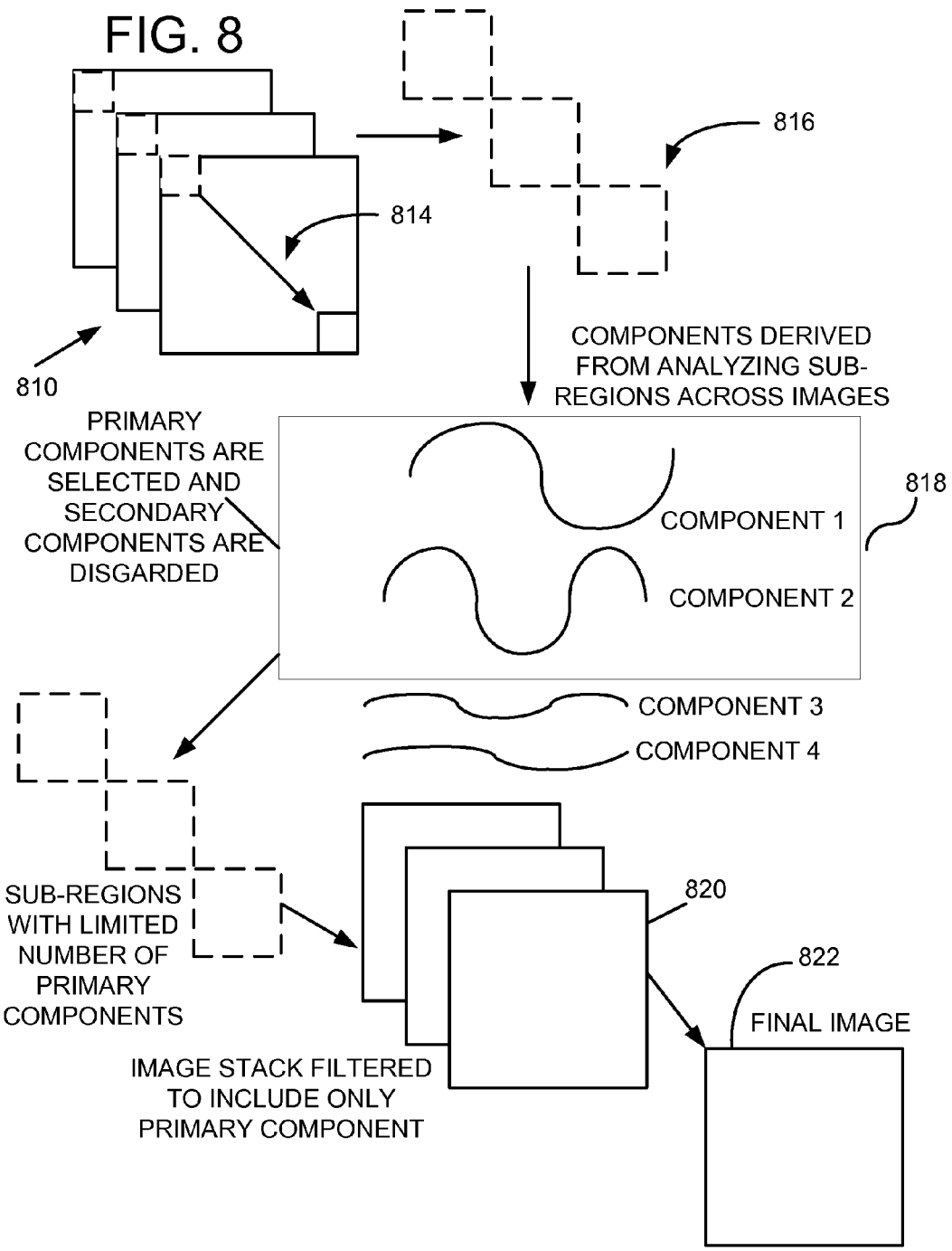
FIG. 8 is a diagram illustrating reduction of noise in an image stack according to one embodiment wherein components are removed for sub-regions in an image and then all images are combined.
Figure 10:
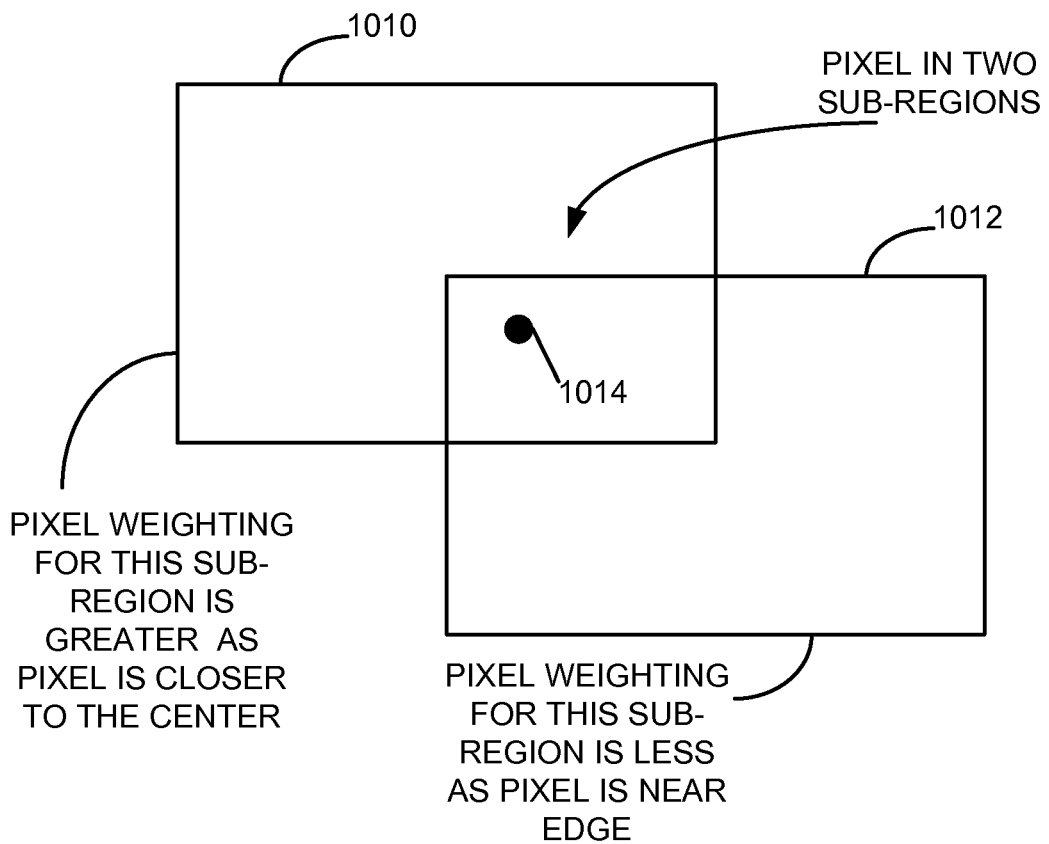
FIG. 10 is a diagram illustrating pixel weighting.

FIGS. 7 and 8 illustrate a detailed flowchart of the method. In process block 710, the stack of images is acquired by obtaining the same object or objects at multiple time points (see FIG. 8 at 810). In process block 712, the sub-regions are slid over the XY coordinates for each image in the image stack (see FIG. 8 at 814, 816). For three-dimensional acquisitions, XYZ coordinates are used. The different components in the sub-regions can be identified using well-known techniques, such as using Principal Component Analysis (PCA) or other entropy-based techniques. In process block 714, each sub-region is filtered independently in order to reduce the number of components to at or below a predetermined threshold. Specifically, each sub-region is filtered by accepting components above a predetermined threshold of amplitude and not exceeding a maximum number of components. A component relates to changing pixel intensity as a function of time and location. For example, in FIG. 8 components 1 and 2 are selected, as shown at 818, while components 3 and 4 are discarded or removed from the image. In process block 718, a weighted sum is performed for each pixel that was included in more than one sub-region. Turning briefly to FIG. 10, two different overlapping sub-regions 1010 and 1012 are shown. An exemplary pixel 1014 is positioned within both sub-regions. When combining the stack of images into a single image, it is desirable if each pixel in the image has a single intensity value. As a result, a weighted sum is performed wherein the pixel location is determined with respect to the sub-region that incorporates the pixel. For example, sub-region 1010 has pixel 1014 closer to its center than does sub-region 1012. Therefore, the pixel intensity for 1014 is provided more weight when calculated for sub-region 1010 than for sub-region 1012. As can be seen in FIG. 8 at 820, the sub-regions can be analyzed for each image in the image stack. The result is that the final image stack has reduced components. Returning to FIG. 7, in process block 718, the images are combined by analyzing corresponding pixels and assigning a maximum intensity for that pixel. In process block 720, the final image is output (see FIG. 8, at 822).

Figure 9:
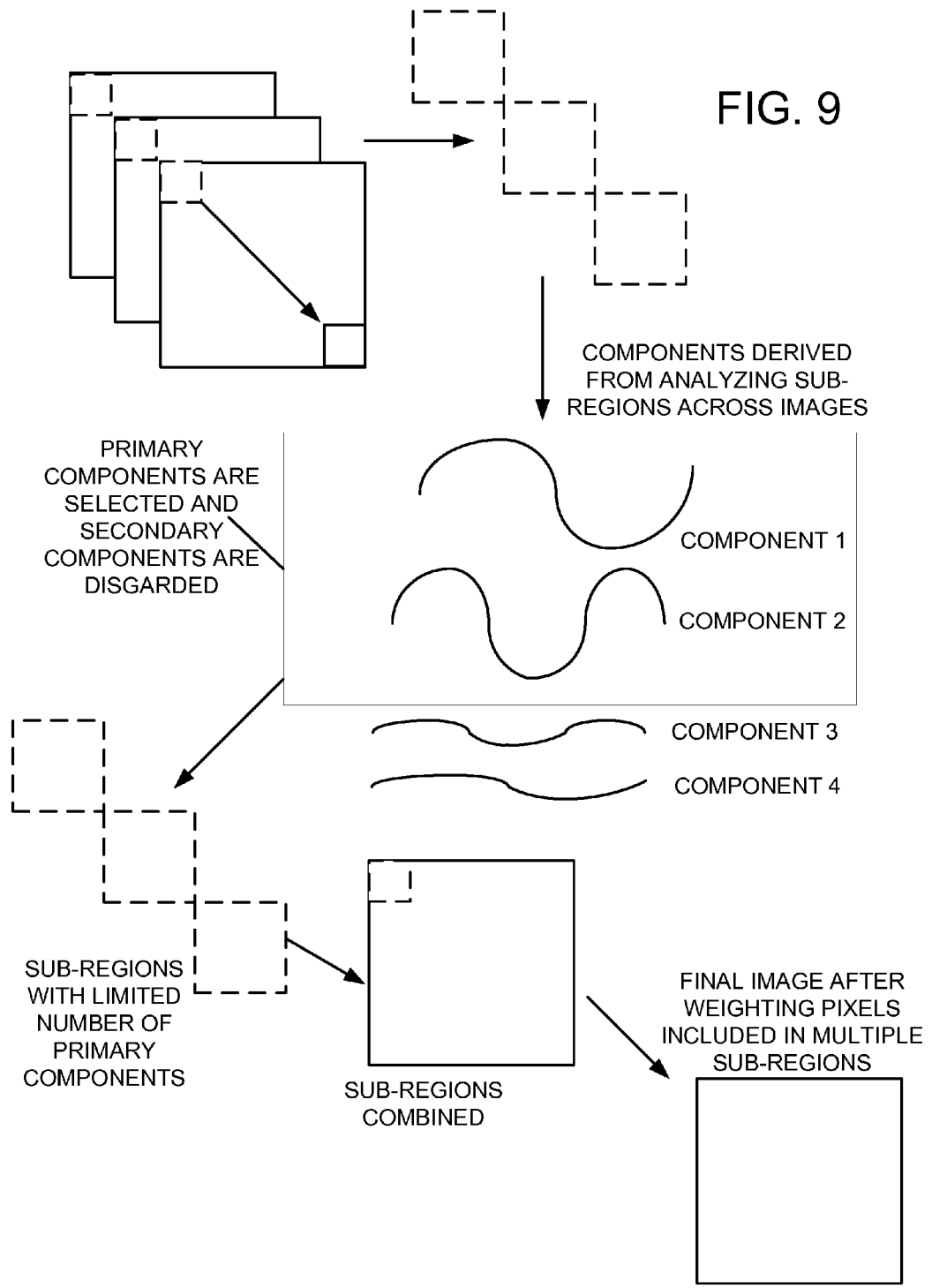
FIG. 9 is a diagram illustrating reduction of noise in an image stack according to another embodiment wherein images are combined through combinations of sub-regions.

As shown in FIG. 9, the stack of images can be combined by combining sub-regions (e.g., collapsing corresponding sub-regions across images) and then combining the sub-regions together to form the final image. After the sub-regions are collapsed, a weighted sum can be performed for any overlapping pixels in a manner already described, in order to produce the final image.

The methods and apparatus of the present disclosure can be used in MRI scans for diffusion-weighted imaging in the body, including the liver, kidney, prostate, etc.) The methods and apparatus can also be used for ultrasound imaging, PET/SPECT and CT scans or optical imaging.

II. Simulations and Experiments

1. Numerical Simulations:

If one assumes that there are at most two independent temporal patterns in a boxcar, then for a given SNR of raw data, a pair of questions arise: a). How large should the boxcar be to minimize RMS errors, and b). For what value of the threshold multiplier, $\beta$, will the correct number of principal components get chosen?

Figure 11A:
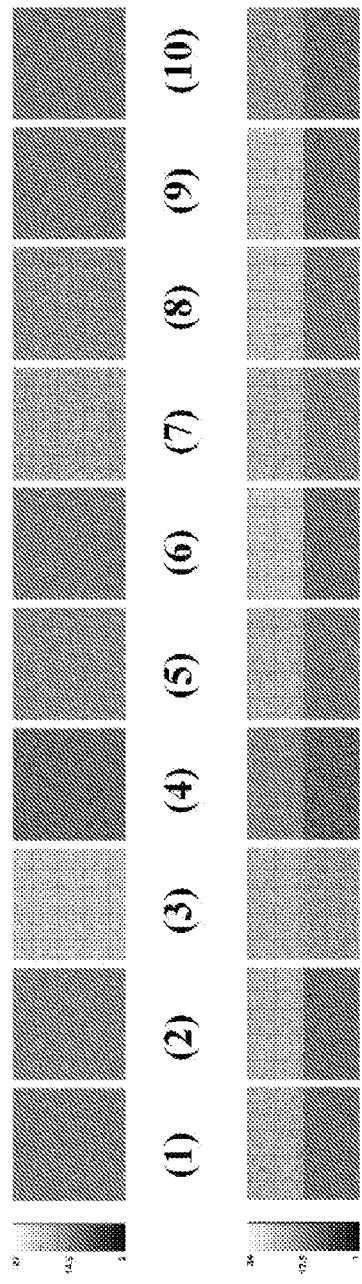
FIG. 11A shows ten repetitions of uniform and two zones fluctuating numerical phantoms with Rician noise added.
Figure 11C:
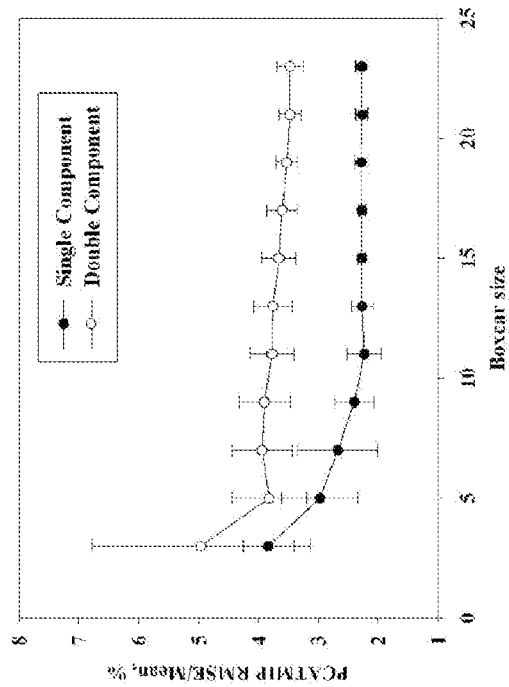
FIG. 11C shows the root-mean-squared error of the peak signal obtained with the present methods relative to the true peak signal.
Figure 11B:
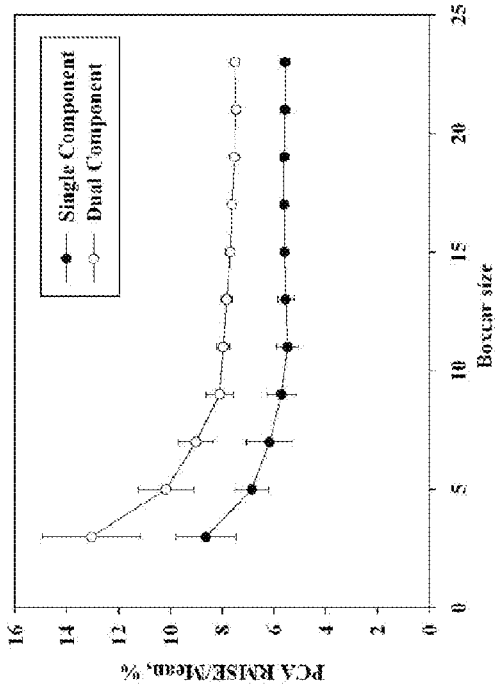
FIG. 11B shows the root-mean-squared error of the PCA filtered signal relative to the true signal.

FIG. 11A shows ten repetitions of uniform (top) and two zones (bottom) fluctuating numerical phantoms with Rician noise added. FIG. 11B shows the RMSE of the PCA filtered signal at all time points relative to the true signal. FIG. 11C shows the RMSE of the peak signal obtained with the present method relative to the true peak signal. In order to validate the present method and to answer these questions, we have employed two different numerical phantoms (implemented with SNR of 5, unless noted otherwise), as shown in FIG. 11:

a. A uniform signal intensity (SI) phantom with added-in fluctuation, and b. A phantom with two non-overlapping zones with the intensities of the two zones fluctuating independently.

The uniform phantom evaluated the selection of one principal component, while the phantom with two non-overlapping zones evaluated the selection of two principal components. Experimentally acquired porcine liver diffusion data was used to generate the signal intensity fluctuation. Regions-of-interest were drawn on the liver and adjacent organ on motion-registered images and the average signal in these ROIs over the ten repetitions was used. For the uniform SI phantom (i.e. liver ROI), the relative level of fluctuation was 15.4% while for the two non-overlapping zones, the levels were 14% and 11%. The uniform phantom with zero signal intensity was used to determine the optimal range for $\beta$, the noise threshold multiplier. Subsequently, processing was performed on the entire image using the optimal boxcar size for the present implementation to evaluate SNR variation.

For determining the effectiveness of the present approach, the following error measures were used:

(i). Root-mean-squared-error (RMSE$_I$) of the processed image intensities of all $$RMSE_I = \sqrt{\sum_{x,y,t}\left[\frac{(I'_s(x, y, t) - I(x, y, t))^2}{S_b * S_b * N_t}\right]}$$

(ii). Root-mean-squared-error (RMSE$_p$) of the maximum intensity $$RMSE_p = \sqrt{\sum_{x,y}\left[\frac{(\Theta'_s(x, y) - \Theta(x, y))^2}{S_b * S_b}\right]}$$

For all the scenarios, the phantom was 128×128 pixels and ten images with intensity fluctuations were generated ($N_t$=10). A range of square boxcar sizes ($S_{b,min}$=5 and $S_{b,max}$=23, in steps of 2) were implemented to evaluate the present approach and to determine optimal boxcar sizes. Two different random noise variants were considered: a). Normally-distributed and b). Rician noise. Since Rician noise introduces amplitude offset to the data, the thresholds for accepting eigenvalues will be different for Rician and normally-distributed data. However, most clinical MRI studies yield absolute data (rather than complex data), for which the noise is Rician in nature and hence the subsequent analysis only considers this noise form. For scenarios where complex data (i.e. real and imaginary components) can be recovered (20) or is available for the DICOM-format DWI images, the analysis for normally-distributed noise is presented in the appendix.

The Rician-distributed noisy intensity images were generated as:

$$I'(x,y,t) = \sqrt{I_r^2(x,y,t) + I_i^2(x,y,t)}$$

wherein $$I_r(x,y,t) = I(x,y,t) + G_1(\sigma)$$

$$I_i(x,y,t) = G_2(\sigma)$$

and $G(\sigma)$ is Gaussian noise with zero mean and standard deviation, $\sigma$:

$$\sigma = \frac{\overline{I(x,y,t)}}{SNR} \quad x, y \in [0, S_{b,max}]$$

For the two non-overlapping zones phantom, the simulation was first performed on a central region straddling the two zones, with the maximum size of 23×23 (i.e. $S_{b,max}$), and subsequently the process was performed on the entire set of images using the optimal values for the sliding window implementation. For this Rician noise phantom, we used a SNR of 6 (achieved for b=800 s/mm² diffusion images on our 1.5T MRI scanner).

2. Experimental Study:

Several experiments were performed on a 1.5T clinical Siemens Avanto MRI scanner (Siemens Medical Solutions, Iselin, N.J.) to verify the present approach:
 a. A noise image was acquired in absolute mode using a FLASH sequence.
 b. A static water/agarose phantom was used to acquire diffusion-weighted images, and
 c. A porcine model was used to acquire diffusion images under physiological conditions.

For all scans, vendor-supplied pulse sequences were used. A monopolar, diffusion-weighted 2D echo-planar imaging (EPI) sequence was used for imaging the water/agarose phantom as well as for the porcine study. For the animal study, a Yorkshire pig (male, 29 kg) was used in accordance with Animal Care and Use Committee (ACUC) regulations under an approved animal use protocol. The animal was anesthetized using isoflurane and its breathing was controlled with a respirator. The EPI sequence was used with the following parameter: b-values of 0, 200, 400 and 800 s/mm², echo time (TE): 68 ms, pulse repetition time (TR): 5 s, parallel imaging rate 2 using GRAPPA, ⅝$^{th}$ partial Fourier, slice thickness: 6 mm, field-of-view (FOV): 320×252 mm², in-plane resolution: 2×2 mm²/pixel.

Ten repetitions of the DWI sequence were used to acquire 18 slices in transverse and coronal directions during free-breathing. Also, to test the stability of the method, we acquired 40 repetitions of the DWI sequence under free-breathing conditions and randomly divided these into six groups of ten repetitions. Two-dimensional non-rigid registration was performed for each data set to correct for bulk motion.

Subsequently, TMIP, the present method and averaging operations were performed prior to obtaining the diffusion trace-weighted images and generating ADC maps. Signal intensity (SI) and signal-to-noise ratios (SNRs) were determined using these approaches and used to evaluate the effectiveness of TMIP and the present approaches relative to averaging.

III. Results

1. Numerical Studies:

FIG. 11 shows RMSE plots for the single-component phantom and the dual-component phantom with Rician noise added in. For both phantoms, the RMSE of the images after principal component analysis (FIG. 11(b)) stabilizes to a small value (<9%) as a percentage of the mean signal. Similarly, the RMSE for the present method (FIG. 11(c)) is fairly low at increased boxcar sizes. For both PCA and the present method, the RMSE stabilizes for boxcars bigger than 11×11.

Using a boxcar size of 15×15 and a threshold multiplier, $\beta$, value of 40, the two-zone phantom shown in FIG. 11(a) was processed using TMIP, the present method and averaging methods.

Figure 12:
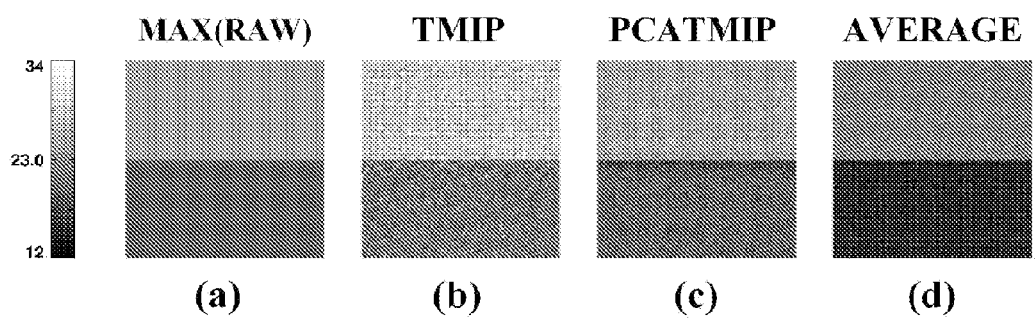
FIG. 12 shows the evaluation of the two-zone phantom for SNR for number 6 of FIG. 11A.

FIG. 12 shows the results of the simulations with all the images windowed to the same level as indicated by the gray-scale bar. FIG. 12(b) shows the ideal noiseless image without image processing while FIG. 12(b-d) show the results after TMIP, the present method (also called PCATMIP) and averaging operations respectively. While TMIP achieves the highest SI, the PCATMIP SI is more true to the maxima of the numerical phantom (since some TMIP signal spikes represent noise). Averaging the noisy phantom yields the lowest signal intensity of the three approaches.

Figure 13:
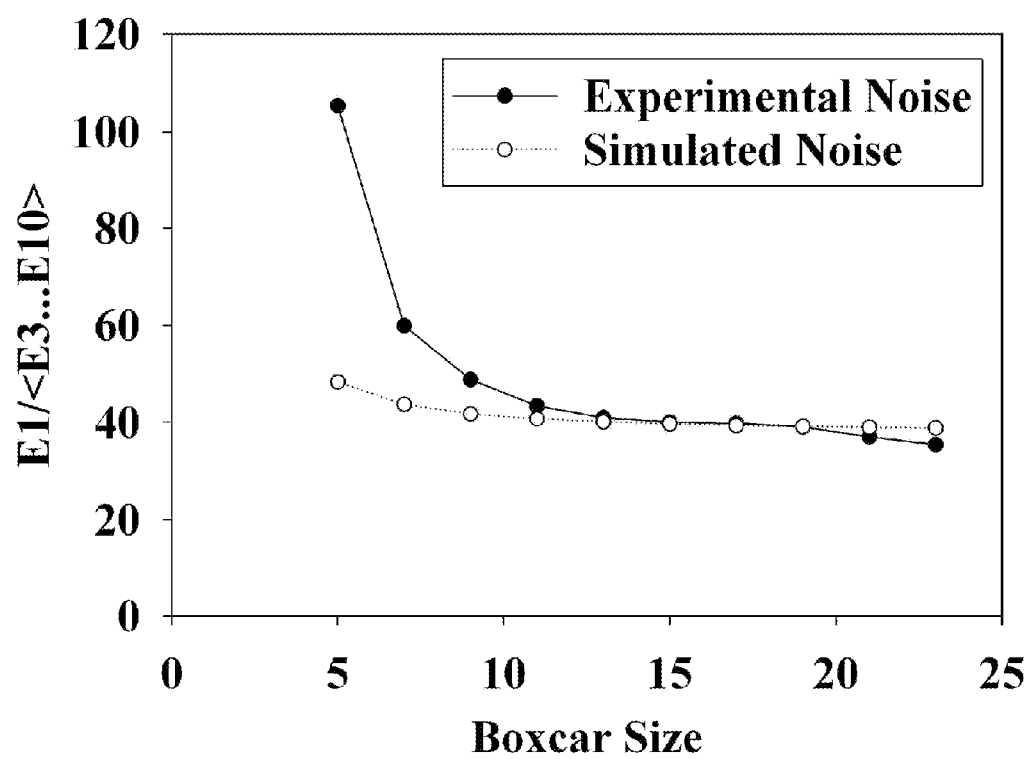
FIG. 13 compares experimental and simulated Rician noise for determining noise rejection threshold in the present approach.

2. Experimental Studies:

The Rician noise acquisition was analyzed and results were compared to numerical simulations in FIG. 13. The results were plotted as a ratio of the first eigenvalue (representing the "DC component") and the last eight eigenvalues, representing the "true noise" in the noise scan. These ratios were computed over a range of boxcar sizes yielding excellent agreement between the numerical and experimental threshold values for boxcar sizes greater than 13.

Figure 14:
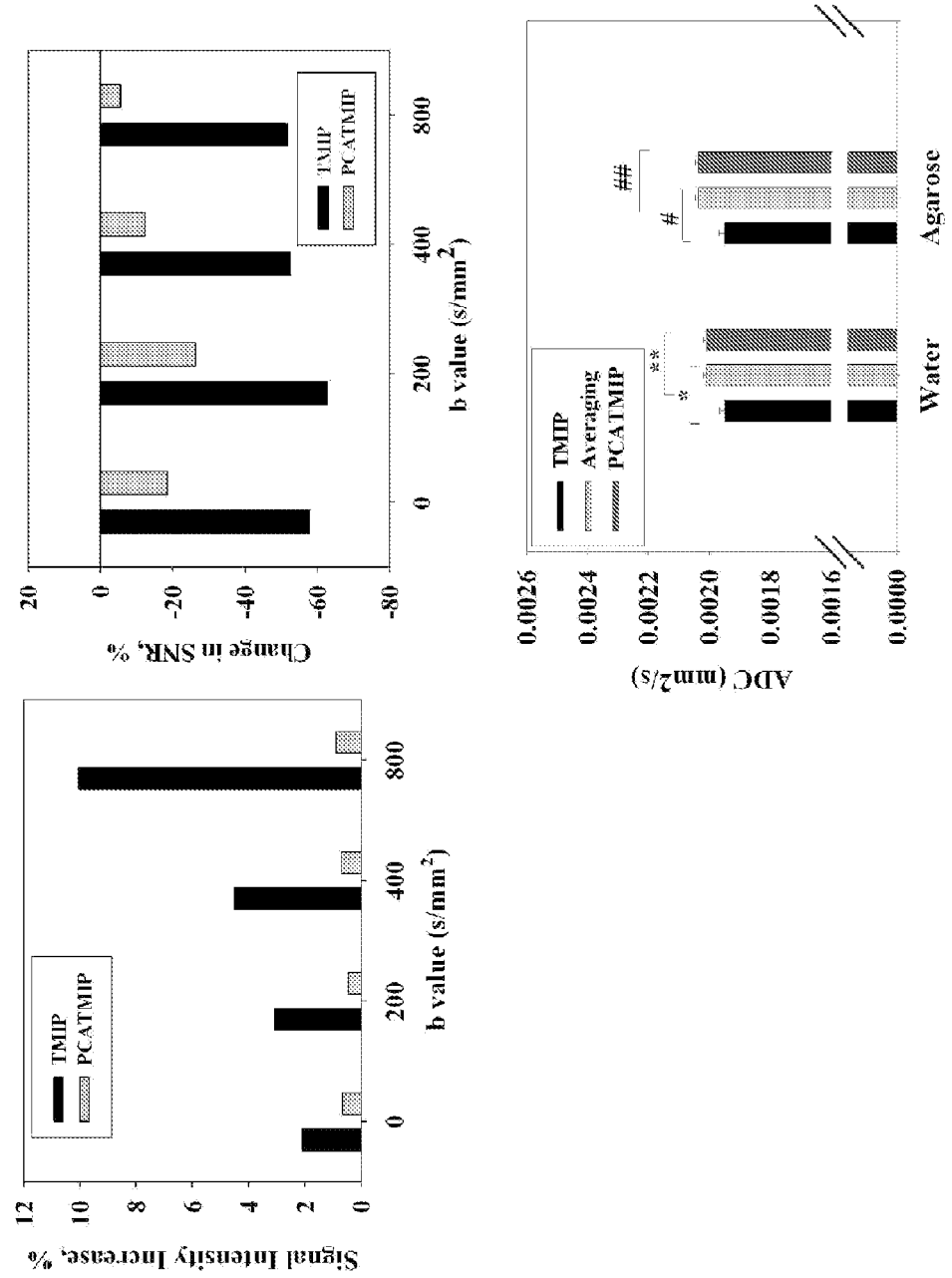
FIG. 14 shows results from a static water-Agarose phantom study.

FIG. 14 shows the results for the water-agarose phantom. Processing was done using a 15×15 boxcar and $\beta$ of 40. Similar to the numerical phantom studies, the TMIP approach yields the highest signal intensity and the least SNR at all b values. The present method (PCATMIP) yields a slight increase in SI of less than 1%, as expected in a static phantom. The SNR of PCATMIP is lower than that of averaging by less than 25%. With similar display windowing, the ADC maps for the agarose/water phantom between that obtained by the present method and averaging are the same and this is confirmed by the calculated ADC values of 2×10⁻³ mm²/s (23) (two-tailed P value of 0.21 and 0.36 for agarose and water, respectively, by t-test for unequal variances using the Microsoft Excel Analysis ToolPak). The ADC value obtained by TMIP is smaller than that obtained by PCATMIP or averaging (P=0).

Figure 15:
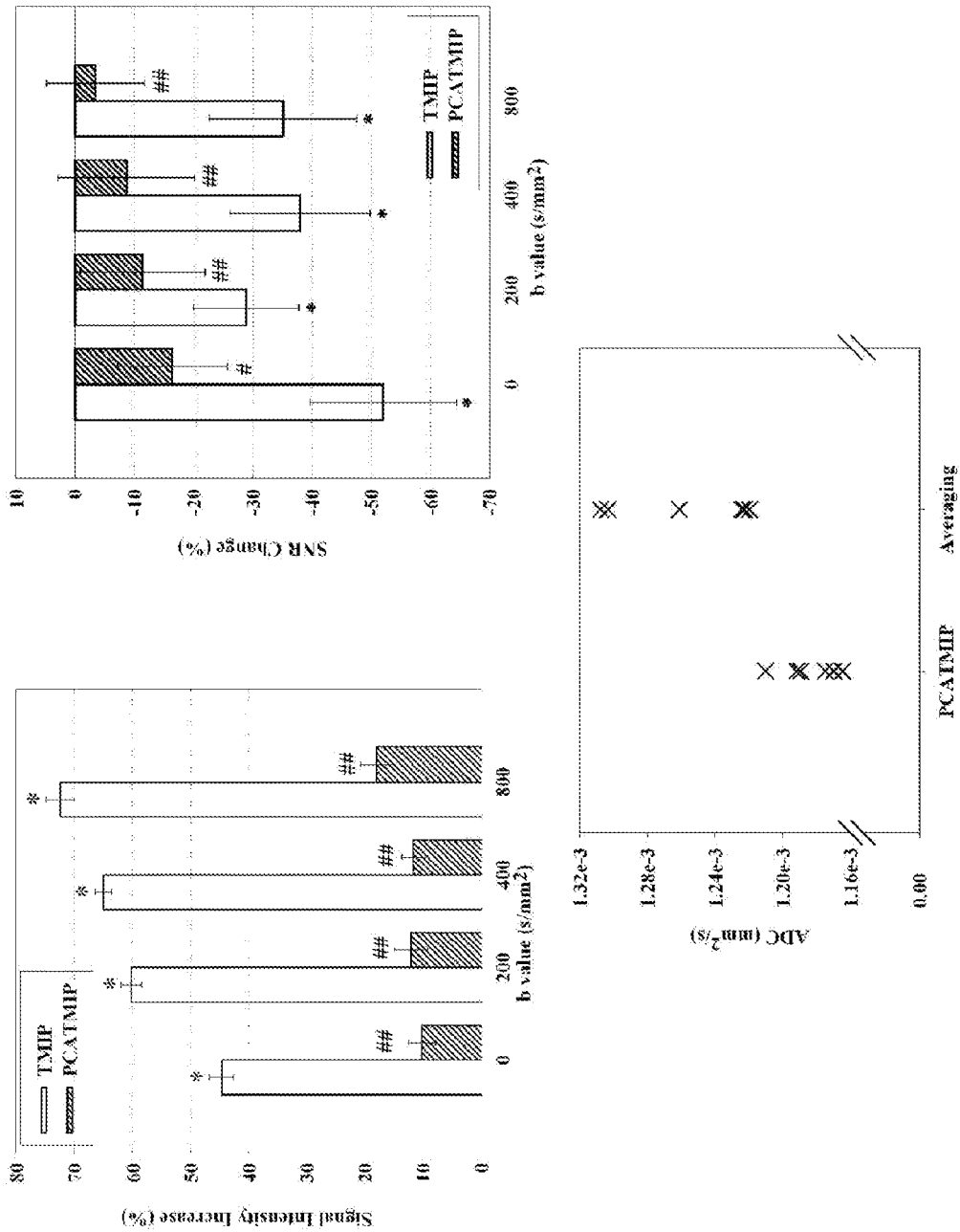
FIG. 15 shows results from a porcine study.

FIG. 15 shows the results for the porcine liver DWI and summarizes the statistics over the six different sets of ten repetitions. As in the phantom study, the present method yields 11-18% higher signal intensity relative to the averaging method (P<0.003 for b=0 and P<0.001 otherwise by two-tail t-test considering unequal variances). While the SNR of TMIP is less than that of the averaging approach for all b values (P<0.002 by two-tail t-test considering unequal variances), the SNR of the present method approaches that of averaging for all b>0 (P=0.33 by two-tail t-test considering unequal variances), and decreased by 16% for b=0 (P=0.03). Using averaging to process the 6 data sets, the ADC value in the liver varied by 4.1×10⁻⁵ mm²/s among the sets. In contrast, the variability was 1.7×10⁻⁵ mm²/s by the present method, suggesting that this method minimized the variability of the ADC measurements by 59%.

Trace-weighted coronal and transverse images (not shown) were also taken and were obtained by the 3 different methods for each b-value considered. While the TMIP images show high signal intensity at all b-values, there is a corresponding increase in noise, as evident at the higher b-values. The present method and averaging approaches yield similar noise levels; however, at higher b-values, the signal intensity in the images using the present method is higher than that of the averaged images. This is especially noticeable in the coronal images in the anterior dome region of the liver (higher b-values averaged images show hypo-intense regions). The difference in image quality between the present method and averaging is also apparent in the transverse images in lateral and central areas of the liver.

Other images were taken (not shown) wherein ADC maps from representative transverse and coronal slices as well as the difference in the values obtained by the three approaches. The ADC maps from TMIP appear to be noisier than those of PCATMIP and averaging, in agreement with the SNR statistics in FIG. 15. The ADC difference between PCATMIP and averaging is positive in some areas and negative in others, indicating that the level of motion-induced signal loss in the averaging approach varies among different b values and from location to location.

Application of the present method for Gaussian noise (i.e. non-Rician noise) is now discussed. For applying the present approach to complex data, Gaussian random noise was added to produce noisy intensity:

$$I'(x,y,t) = I(x,y,t) + d(x,y,t)$$

wherein the width of the normal distribution was $$\text{Noise Level} = \frac{\overline{I(x, y, t)}}{SNR} \quad x, y \in [0, S_{b,max}]$$

Similar to the Rician analysis, a range of square boxcar sizes ($S_{b,min}$=3 and $S_{b,max}$=23, in steps of 2) were considered. Both first and second eigenvector RMSEs were found to approach zero for boxcar sizes greater than 9.

Monte Carlo simulation using a SNR of 2 was used to determine the range of boxcar sizes and threshold multiplier (β) values over which the correct number of eigenvalues was successfully determined for single-component and dual-component phantoms. These simulations show that while the effective range for β is between 1 and 60 for a single-component phantom, its range is between 1 and 8 for selecting two-components for the given SNR.

Based on the these results, a boxcar of 11×11 was further evaluated and while the single-component phantom has a very large range over which the value of β could be chosen, the dual-component phantom was found to yield successful selection of eigenvalues for β values greater than 2 so long as SNR greater than 1 was achieved.

Figure 16:
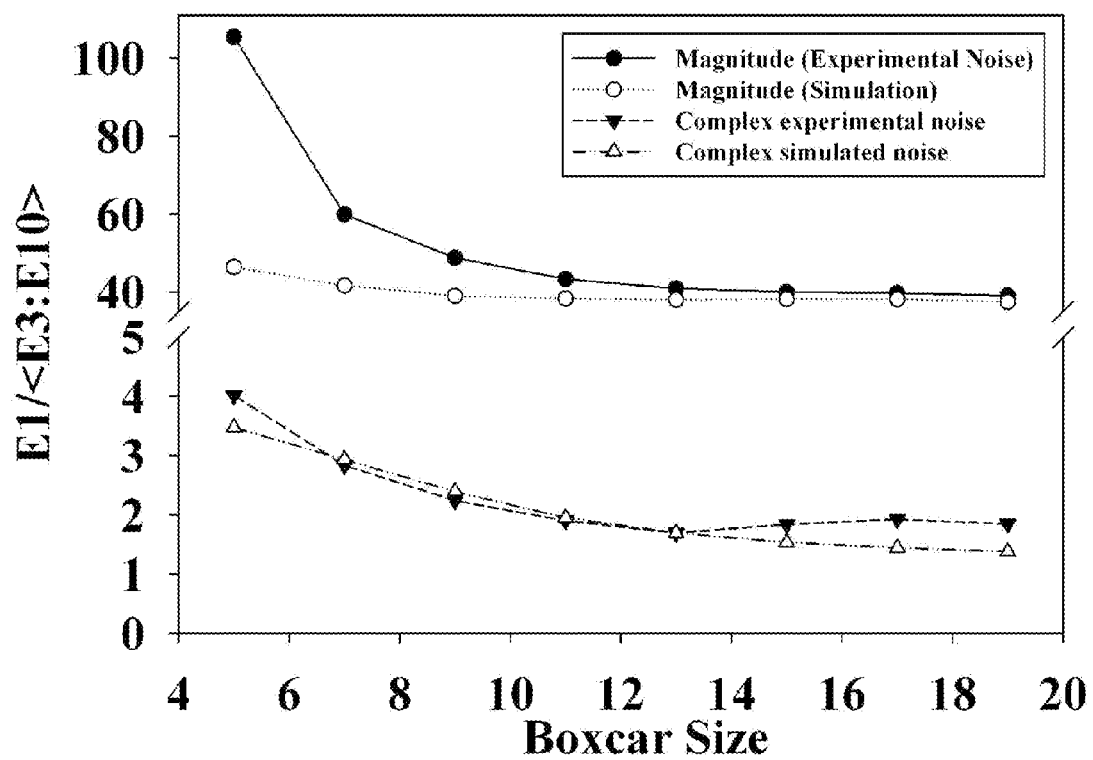
FIG. 16 compares experimental and simulated Rician and Gaussian noise for determining the threshold for noise rejection.

Finally, considering the noise-only phantom, the numerically computed results were compared to the eigenvalue ratio from the experimentally acquired noise scan (FIG. 16). Unlike the Rician noise analysis, the Gaussian noise analysis yields a lower ratio of E1/<E3:E10>. Also, both numerically synthesized noise and the experimental scan yielded similar results for boxcar sizes greater than 10 with the ratio tending towards 2.

Based on these simulations, for a diffusion-weighted set where the complex data is readily available, PCATMIP can be successfully used with a boxcar size of 11×11 and a β of 2.

IV. Discussions and Conclusions

Physiological motion-induced signal attenuation has generally affected the utility of diffusion MRI particularly for body imaging. While image registration corrects for the physical movement of anatomical features, it does not help with the signal attenuation. While averaging over multiple repetitions improves image SNR, it does not resolve this motion-induced signal loss issue.

An intuitive method for recovering motion-induced signal loss is to perform a pixel-wise maximum intensity projection (TMIP) over the multiple repetitions instead of averaging them. Ideally, this results in a DWI data set of the least amount of motion-induced signal loss. However, since TMIP assigns the pixel values of individual repetitions to the final result, noise spikes can easily be highlighted, leading to overestimation of the image intensity and high noise levels.

The present approach (called the PCATMIP approach) achieves an optimal middle ground between averaging and TMIP. Our pig study showed that the principle component analysis (PCA) of local temporal modes allowed us to remove random noise from the physiological fluctuations prior to the TMIP procedure. The result was recovery of motion-induced signal loss while maintaining SNR comparable to simple averaging. The keys to successfully implementing PCATMIP are correctly selecting the boxcar size and identifying the threshold amplitude of the temporal modes that separates coordinated physiological fluctuations from random noise.

Simulations show that very small boxcar sizes lead to a mixing of the temporal modes that represent bulk motion with those of random noise, resulting in large errors in the estimated motion-induced fluctuations. However, too large a boxcar size may include more than 2 independent modes of motion, resulting in lower SNR. The optimal boxcar size should be as small as possible but large enough to avoid appreciable contamination from random noise modes. For a given boxcar size and noise distribution in the raw data, it is also essential to determine a threshold amplitude of the temporal modes which is just high enough to reject all the random noise modes. For Rician noise, where the noise is positively biased, a boxcar size of 30 mm and a threshold multiplier of 40 have been found to be a good combination. Significantly, when the incoming raw data contains both magnitude and phase, the threshold multiplier can be set much lower. For this reason, it is worthwhile to keep the phase information in the raw data.

Computationally, PCATMIP analysis of a three b-values DWI dataset acquired over 10 repetitions requires less than a minute after the non-rigid-body data registration (which also takes about a minute).

In summary, we have developed an approach that permits the recovery of signal intensities, primarily by the suppression of the noise components of the acquired data, and by maximizing the signal intensity at each spatial point across multiple repetitions of the image acquisition. This PCATMIP approach combines the optimal aspects of averaging and TMIP operations and yields higher signal intensity as well as higher signal-to-noise ratios than either operation, respectively. Due to these enhancements, this image processing approach may prove useful in extending diffusion-weighted imaging for body applications clinically.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope of these claims.

We claim:

1. A method of reducing noise in an image stack including a time-series of images, comprising:
   receiving the image stack;
   dividing each image in the image stack into sub-regions that include two or more pixels;
   identifying temporal components in the sub-regions, wherein at least some of the sub-regions include two or more temporal components and the temporal components represent a change in pixel intensity as a function of time across the sub-region;
   for each sub-region, selecting the temporal components with at least the highest amplitude and discarding the other temporal components; and
   combining, using a computer, each of the images in the image stack using the sub-regions with reduced temporal components in order to produce a final image representing all of the images in the image stack.

2. The method of claim 1, wherein selecting the temporal components includes comparing the temporal components to a predetermined amplitude threshold and selecting only the components that are above the predetermined amplitude threshold.

3. The method of claim 2, wherein if a number of components above the predetermined amplitude threshold is above a predetermined limit, then selecting two of the highest amplitude temporal components and discarding all other temporal components.

4. The method of claim 1, wherein the sub-regions have one of the following shapes: square, rectangular, circular, triangle or oval or the sub-region is a line segment.

5. The method of claim 1, wherein for each sub-region, selecting the temporal components includes:
   calculating a hermitian matrix using intensity values for each pixel in the matrix;
   determining eigen vectors of the hermitian matrix;
   calculating eigen values corresponding to the eigen vectors;
   determining the principal components by using intensity values of the temporal components;
   calculating new image for the sub-region using a limited number of the principal components.

6. The method of claim 5, wherein the principal components $P_j(a,b)$ are calculated over the sub-region as follows:

$$P_j(a, b) = \sum_m I(a, b, m)V_j^*(m)$$

such that $\iint P_i(a,b)P_j(a,b)dadb=0$ unless $i=j$.

7. The method of claim 6, wherein a new image is calculated for each subregion using the following formula:

$$I'(a, b, m) = \sum_j P_j(a, b)V_j(m)$$

8. The method of claim 1, further comprising:
   determining which pixels in the stack of images are included in multiple overlapping sub-regions;
   weighting the determined pixels values based on their location in the sub-regions; and
   combining the weighted pixels into a single pixel.

9. The method of claim 1, wherein combining the images includes determining which of the images with reduced temporal components has a maximum intensity for each pixel and assigning the pixel value with the maximum intensity as the pixel value in the final image.

10. A method of reducing noise in an image stack, which includes a time-series of images, comprising:
    capturing, using imaging hardware, multiple images of a subject using a single image protocol, wherein the multiple images are captured with an amount of time between images;
    performing a localized analysis using a sub-region of the multiple images in order to remove components with lower amplitudes that are within the sub-region, wherein a sub-region includes two or more pixels in each of the multiple images;
    moving the sub-region around the multiple images and performing, using a computer, the localized analysis independently on each sub-region until all pixels in the multiple images have been analyzed to obtain multiple filtered images with components removed; and
    using the computer, combining the multiple filtered images to obtain a single final image from the image stack.

11. The method of claim 10, wherein performing localized analysis includes projecting the sub-region across the multiple images and identifying a number of components in that sub-region by analyzing a change in pixel intensity as a function of time and location.

12. The method of claim 10, wherein combining the multiple filtered images includes determining which of the multiple filtered images has a maximum intensity for each pixel and assigning the pixel value with the maximum intensity as the pixel value in the single final image.

13. The method of claim 10, wherein combining the multiple filtered images includes combining at the sub-region level across images and then combining resultant sub-regions to obtain the single final image.

14. The method of claim 10, wherein performing localized analysis includes identifying a change in pixel intensity as a function of time and location in order to determine temporal components in the sub-region.

15. The method of claim 10, wherein the sub-region is defined by a line segment, or a two-dimensional or three-dimensional geometric pattern that is projected across all images in the temporal image stack.

16. The method of claim 10, further including performing a weighted summation for a pixel included in more than one sub-region, wherein the weighting is dependent upon proximity of the pixel to a center of the sub-region.

17. The method of claim 10, further including performing a registration so that imaged objects are sized and positioned equally across each of the images in the image stack.

18. The method of claim 10, wherein a sub-region has a predetermined geometric configuration, which is modifiable through user input.

19. The method of claim 10, wherein the stack of images are captured using MRI, X-Ray, CT scans or other imaging modalities including PET, SPECT, ultrasound or optical.

20. A method of reducing noise in an image stack, which includes a time series of images, comprising:
- capturing a time series of images using an imaging modality;
- using a computer, performing a localized component analysis on sub-regions projected across each image in the time series, each sub-region including a plurality of pixels;
- canceling at least some of the components on a localized basis to obtain a series of images with reduced components;
- combining the series of images with reduced components into a single image by analyzing each corresponding pixel across the images and determining a pixel value for each pixel based on the analysis.

21. The method of claim 20, further including determining components in a sub-region by analyzing pixel intensity as a function of time and location and assigning a different component for each different function.

22. The method of claim 20, further comprising performing an elastic warping registration on the sub-regions.

23. The method of claim 20, wherein the sub-regions have pixels that overlap so that the localized component analysis is performed on some pixels multiple times and results for such pixels are weighted based on the pixel's location in the sub-region.

* * * * *